US005692637A

United States Patent [19]
Hodge

[11] Patent Number: 5,692,637
[45] Date of Patent: Dec. 2, 1997

[54] VENT CAP FOR ELECTRONIC PACKAGE

[75] Inventor: Ronald Curtis Hodge, Kokomo, Ind.

[73] Assignee: Delco Electronics Corporation, Kokomo, Ind.

[21] Appl. No.: 644,763

[22] Filed: May 10, 1996

[51] Int. Cl.⁶ .................................................. B65D 51/16
[52] U.S. Cl. .................. 220/366.1; 220/374; 220/4.02; 215/307; 174/17 VA
[58] Field of Search ................ 220/366.1, 367.1, 220/374, 371, 373, 203.19, 203.29, 203.28, 203.27, 203.24, 203.23, 4.02, 3.8; 215/307, 308, 309; 174/50, 17 VA

[56] References Cited

U.S. PATENT DOCUMENTS

| | | | |
|---|---|---|---|
| 2,601,820 | 7/1952 | Paul et al. | 220/366.1 X |
| 2,644,609 | 7/1953 | Foss | 220/374 |
| 3,199,716 | 8/1965 | Price | 220/374 X |
| 3,216,148 | 11/1965 | Amberg | 220/366.1 X |
| 3,927,798 | 12/1975 | Loomis | 220/374 |
| 4,315,579 | 2/1982 | Martin, Jr. | 220/374 X |
| 4,819,830 | 4/1989 | Schultz | 220/374 X |
| 5,009,325 | 4/1991 | Weber | 220/374 |
| 5,024,345 | 6/1991 | Deweerdt | 220/374 X |

FOREIGN PATENT DOCUMENTS 447907  4/1948  Canada ................ 220/374

*Primary Examiner*—Allan N. Shoap
*Assistant Examiner*—Nathan Newhouse
*Attorney, Agent, or Firm*—Mark A. Navarre

[57] ABSTRACT

A differential pressure sensor having a vent to atmosphere and mounted where it is subject to water spray has a vent cap which protects against spray entering the vent and prohibits water residing along the cap edges from being drawn into the vent. The vent is surrounded by an upstanding collar and the vent cap snaps onto the collar. A shroud extends laterally from one side of the cap to a point beyond the sensor package and further extends down below the upper surface of the package. The shroud is open at the bottom to afford an air passage to the vent as well as a baffle against spray.

4 Claims, 1 Drawing Sheet

5,692,637

VENT CAP FOR ELECTRONIC PACKAGE

FIELD OF THE INVENTION

This invention relates to venting of an electronic package and particularly to a cap for venting to atmospheric pressure without admitting water.

BACKGROUND OF THE INVENTION

To detect fuel vapor leaks in automotive fuel systems it has been proposed to monitor the vapor pressure in the vehicle fuel tank. This is accomplished using a differential pressure sensor which compares the vapor pressure to atmospheric pressure. The sensor is thus coupled by a hose or other passage to the fuel tank and also has a vent to atmosphere. Typically such sensors are located near the fuel tank and often they are subject to water spray from the wheels.

As shown in FIG. 1, a prior art sensor comprises an electronic package 10 including a pressure sensor and associated electronic circuitry, not shown. A vent 12 in the top surface 14 of the package is surrounded by an upstanding collar 16 with an outer rim 18. The collar is loosely covered by a cap 20 intended to protect the vent from solids or liquids while allowing air to flow into or out of the sensor package. In particular, air flows according to atmospheric pressure changes and further flows out of the package when the package heats up and flows in when the package cools down. A filter 22 inside the vent consists of a material having pores which pass air but are too small to admit water; it also catches dust or other particles which may find its way under the cap. The cap 20 includes a top 24 covering the vent 12 and a skirt 26 which surrounds the collar and has an inner flange 28 which snaps over the rim 18 when the cap is installed. The skirt 26 nearly reaches the top surface 14 such that when water accumulates on the surface it can reach the skirt, sealing the air passage around the edge of the cap. When air is drawn into the package upon cooling, it is possible for the water to also be drawn in. The filter 22, however, is sealed by the water so that during temperature change the outside air is isolated from the pressure sensor until the water evaporates from the filter. This results in abnormal output voltages or false pressure signals.

SUMMARY OF THE INVENTION

It is therefore an object of the invention to vent an electronic package subject to water in a way to inhibit water entering the vent. Another object is to configure a vent cap of such an electronic package to admit atmospheric air and keep out water.

An electronic package for mounting in a vehicle in a position to receive water spray from the vehicle wheels has a housing with a vent in its upper surface to admit atmospheric pressure to the interior of the housing. The vent includes an aperture surrounded by an upstanding collar. A vent cap loosely fits over the collar to cover the aperture but still admit air, and has a side skirt spaced above the upper surface. The cap is elongated horizontally, extending laterally to a point beyond the housing and further extending down below the plane of the housing upper surface. The bottom of the lateral extension is open to admit air but is not in a position to draw in water. Rather, the air passage afforded by the extension will prevent any pressure differential which could draw water in under the skirt.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to a vent cap specifically designed for a differential pressure sensor used in a fuel vapor monitoring system for vapor leak detection, it will be apparent that the cap construction can advantageously be applied to other electronic packages requiring a vent and would be especially desirable where such packages are subject to water.

Figure 1:
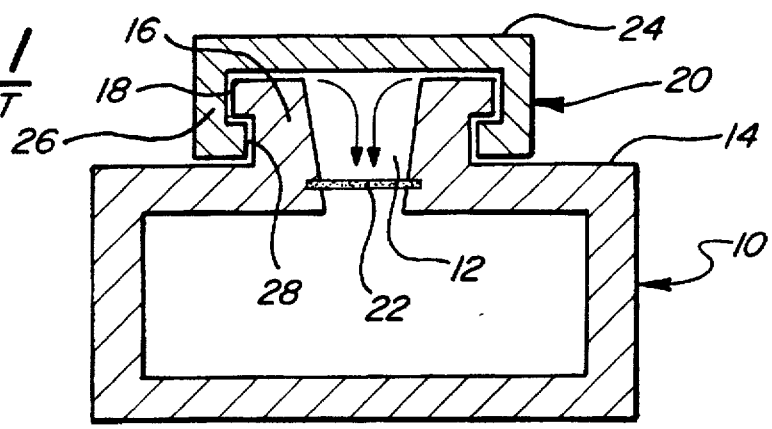
FIG. 1 is a cross-section of an electronic package with a vent cap according to the prior art.
Figure 2:
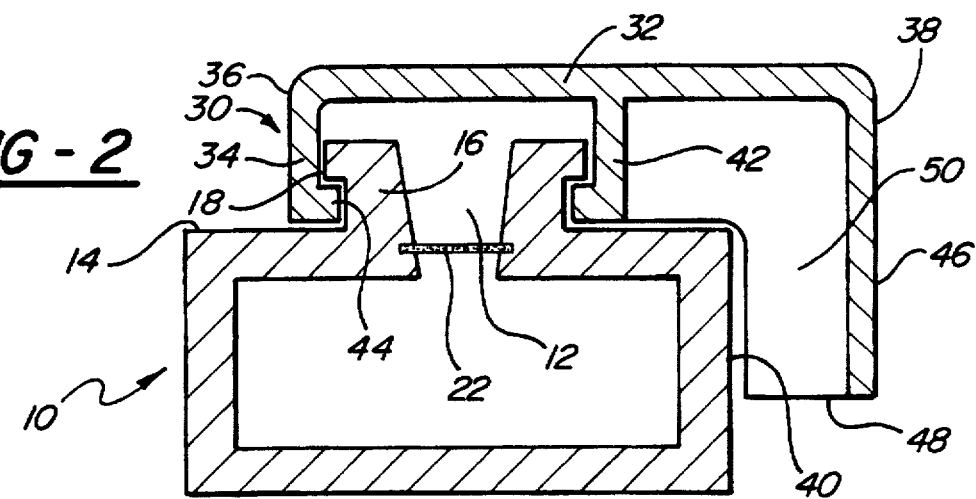
FIG. 2 is a cross-section of an electronic package with a vent cap according to the invention.
Figure 3:
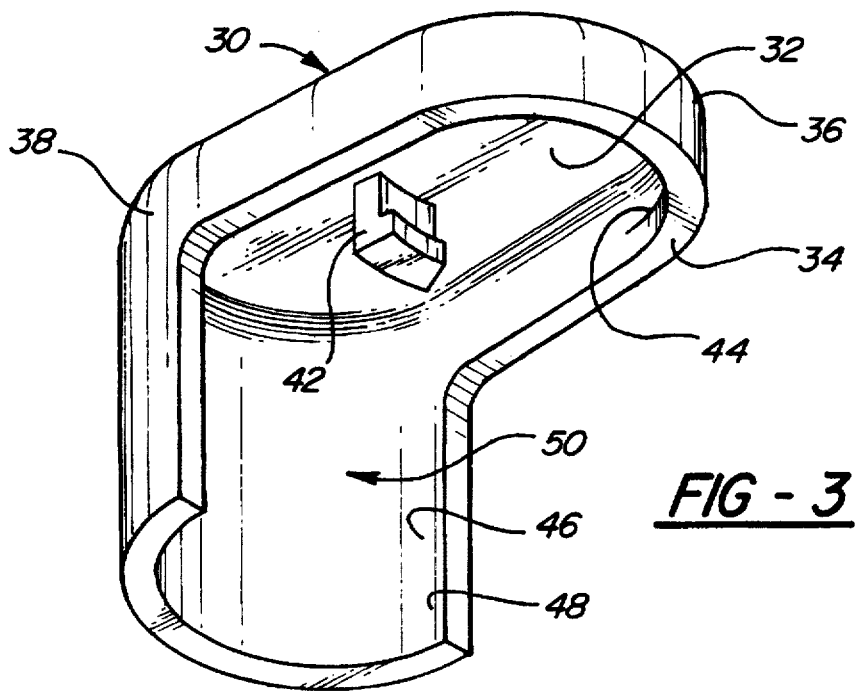
FIG. 3 is an isometric view of a vent cap according to the invention.

Referring to FIGS. 2 and 3, the electronic package 10 is the same as that of FIG. 1, and the vent cap 30 is a modified version of the cap 20 of FIG. 1. The vent cap is a one-piece molded part. The top 32 of the cap 30 is generally oval or elongated and a skirt 34 depends from the top such that one arcuate end 36 of the skirt fits about half way around the collar 16 and the other arcuate end 38 extends beyond the side wall 40 of the package housing. A narrow web 42 spaced from the skirt 34 at each side of the cap extends down from the top to engage the side of the collar 16 opposite the end 36 to firmly secure the cap to the collar. At least the arcuate end 36 and optionally the web 42 has an inner flange 44 to cooperate with the outer rim 18 of the collar in a snap-on relationship.

The portion 46 of the skirt along the end 38 is long enough in the vertical direction to extend down below the surface 14 of the housing. The skirt portion 46 is generally semi-cylindrical and is open at its lower end 48 to define a generous air passage 50 leading to the vent 12. Due to the narrow width of the web 42 there is free air passage around each side of the web. The lateral portion of the cap between the web 42 and the end 38 comprises a shroud which protects against entry of water spray. The long semi-cylindrical skirt portion 46 serves as a baffle which guards against spray entry to the vent.

It will be noted that even if water accumulates or puddles on the upper surface 14 around the cap, it will not be drawn into the cap to the vent when the package cools because of the clear air passage 50 which admits air and eliminates any pressure differential which might draw in water. Thus the simple one-piece molded cap serves to cover the vent and has an air passage which prohibits a suction action which would draw water into the vent.

The embodiments of the invention in which an exclusive property or privilege is claimed are defined as follows:

1. A vented enclosure for an electronic device comprising: a walled housing which encloses the electronic device, the housing having an opening in a top surface for permitting air to pass into and out of the housing, the housing having a upstanding collar surrounding the opening and a rim depending from the free end of such collar;

a cover including a top a one side wall disposed over the upstanding collar of said housing so as to shield said opening from liquids sprayed against said housing, said cover having a pair of integrally formed flange elements, a said flange elements extending from said top of said cover in spaced relationship from said side wall, said flange elements being snap-fit against said collar between said depending rim and said top surface of said housing so as to retain the cover over said collar, while allowing air to pass into and out of said housing through a low clearance passage between said flange elements and said top surface of said housing; and a shroud formed integral with said cover in a region surrounding said one flange element, and extending laterally from said region and then towards the housing to define an auxiliary air duct through which air is allowed to pass into and out of said housing, around said one flange element, and through a high clearance passage between the top of said cover and said housing rim, so that in the presence of a lower than atmospheric pressure inside said housing, air passes into said housing through said high clearance passage, and liquid lying on said top surface of the housing in said low clearance passage is prevented from being drawn into said housing between said collar and said flange elements.

2. The vented enclosure defined in claim 1 wherein the shroud extends beyond the plane of a side wall of said housing.

3. The vented enclosure defined in claim 1 wherein:

the cover and shroud are molded as one piece; and the shroud extends beyond the plane of a side wall of said housing and below said top surface of said housing and includes a baffle for blocking water spray access.

4. The vented enclosure defined in claim 1 wherein the shroud extends beyond the plane of a side wall and below said top surface of said housing and includes a vertical end wall which serves as a baffle for blocking lateral water access.

* * * * *